(12) United States Patent
Hamann et al.

(10) Patent No.: US 8,731,883 B2
(45) Date of Patent: *May 20, 2014

(54) TECHNIQUES FOR THERMAL MODELING OF DATA CENTERS TO IMPROVE ENERGY EFFICIENCY

(71) Applicant: International Business Machines Corporation, Armonk, NY (US)

(72) Inventors: Hendrik F. Hamann, Yorktown Heights, NY (US); Madhusudan K. Iyengar, Woodstock, NY (US); Theodore G. vanKessel, Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/644,234

(22) Filed: Oct. 3, 2012

(65) Prior Publication Data

US 2013/0166258 A1    Jun. 27, 2013

Related U.S. Application Data

(63) Continuation of application No. 12/146,852, filed on Jun. 26, 2008, now Pat. No. 8,306,794.

(51) Int. Cl.
*G06G 7/54* (2006.01)
*G06G 7/48* (2006.01)

(52) U.S. Cl.
USPC .......................................................... 703/5

(58) Field of Classification Search
USPC .......................................................... 703/5
See application file for complete search history.

(56) References Cited

U.S. PATENT DOCUMENTS

| | | |
|---|---|---|
| 7,031,870 B2 | 4/2006 | Sharma et al. |
| 7,184,925 B2 | 2/2007 | Augustin et al. |
| 7,222,043 B2 | 5/2007 | Augustin et al. |
| 7,366,632 B2 | 4/2008 | Hamann et al. |

(Continued)

FOREIGN PATENT DOCUMENTS

JP    2007120889 A    5/2007

OTHER PUBLICATIONS

Y. Amemiya et al., "Comparison of Experimental Temperature Results with Numerical Modeling Predictions of a Real-World Compact Data Center Facility," Proceedings of IPACK2007 ASME InterPACK '07 (Jul. 2007).

(Continued)

*Primary Examiner* — David Silver
(74) *Attorney, Agent, or Firm* — Vazken Alexanian; Michael J. Chang, LLC (57) ABSTRACT

Techniques for modeling a data center are provided. In one aspect, a method for modeling a data center is provided. The method comprises the following steps. Spatially dense three-dimensional thermal distribution and air flow measurements made in the data center using a mobile off-line surveying system are obtained. A temperature and air flow model for the data center is created using the spatially dense three-dimensional thermal distribution and air flow measurements. The temperature and air flow model is used to make thermal distribution and air flow predictions of the data center. The thermal distribution and air flow predictions are compared with the thermal distribution and air flow measurements made using the mobile off-line surveying system to produce a validated model for the data center.

15 Claims, 9 Drawing Sheets

(56) References Cited

U.S. PATENT DOCUMENTS

| | | |
|---|---|---|
| 7,444,190 B2 | 10/2008 | Pflugl et al. |
| 7,644,051 B1 | 1/2010 | Moore et al. |
| 7,894,943 B2 | 2/2011 | Sloup et al. |
| 2004/0133406 A1 | 7/2004 | Ozeki et al. |
| 2006/0100735 A1 | 5/2006 | Hauf et al. |
| 2006/0255934 A1 | 11/2006 | Easley et al. |
| 2007/0032979 A1* | 2/2007 | Hamann et al. ............... 702/130 |
| 2007/0089446 A1* | 4/2007 | Larson et al. ................ 62/259.2 |
| 2007/0098037 A1 | 5/2007 | Hamann et al. |
| 2008/0106437 A1 | 5/2008 | Zhang et al. |
| 2008/0288193 A1 | 11/2008 | Claassen et al. |

OTHER PUBLICATIONS

Bash et al., "Dynamic Thermal Management of Air Cooled Data Centers," IEEE pp. 445-452 (2006).

Rambo et al., "Modeling of Data Center Airflow and Heat Transfer: State of the Art and Future Trends," Distributed and Parallel Databases, vol. 21, Nos. 2-3, pp. 193-225(33) (Jun. 2007) (abstract).

A. Ortega, "Experimental Measurement of Steady 3-D Thermal Green's Function," American Society of Mechanical Engineers, Heat Transfer Division, vol. 374, issue 1, pp. 381-387 (2003).

Sen et al., "Laplace's Equation for Convective Scalar Transport in Potential Flow," Proc. R. Soc. Lond. A (2000) 456, pp. 3041-3045.

Wang, "A Potential and Stream Function Analysis of Two-Dimensional Steady-State Convective Diffusion Equations Involving Laplace Fields," Int. J. Heat Mass Transfer, vol. 28, No. 6, pp. 1089-1095 (1985).

HP-News release: HP Drives Data Center Energy Efficiency With Thermal Services and Dynamic Smart Cooling—Palo Alto, CA (Jul. 25, 2007).

J. Rambo, Dissertation: Reduced-Order Modeling of Multiscale Turbulent Convection: Application to Data Center Thermal Management, Georgia Institute of Technology, vol. 6805B of Dissertations Abstracts International (2006).

Chandrakant Patel, "Smart Data Center," (2003).

Quighui Tang, "Sensor-Based Fast Thermal Evaluation Model for Energy Efficient High Performance Datacenters," (Dec. 2006).

Mohammed H. Rahimi, "Bioscope: Actuated Sensor Network for Biological Science," thesis, Dec. 2005.

\* cited by examiner

FIG. 10A
MODEL RESULTS @ 5.5 FEET

TEMPERATURE LEGEND FOR MODEL AND DATA CONTOURS

FIG. 10B
EXPERIMENTAL DATA @ 5.5 FEET

FIG. 10C
DIFFERENCE BETWEEN MODEL AND DATA

TEMPERATURE LEGEND FOR MODEL AND DATA CONTOURS

FIG. 11A
MODEL RESULTS AFTER CHANGES

TEMPERATURE LEGEND FOR MODEL AND DATA CONTOURS

FIG. 11B
EXPERIMENTAL DATA @ 5.5 FEET

FIG. 11C
DIFFERENCE BETWEEN MODEL AND DATA

TEMPERATURE LEGEND FOR MODEL AND DATA CONTOURS

TECHNIQUES FOR THERMAL MODELING OF DATA CENTERS TO IMPROVE ENERGY EFFICIENCY

CROSS-REFERENCE TO RELATED APPLICATIONS

This application is a continuation of U.S. application Ser. No. 12/146,852 filed on Jun. 26, 2008, now U.S. Pat. No. 8,306,794, which is related to the commonly owned U.S. application Ser. No. 12/146,952, filed on Jun. 26, 2008, the contents of each of which are incorporated by reference herein.

FIELD OF THE INVENTION

The present invention relates to data centers, and more particularly, to techniques for modeling data centers.

BACKGROUND OF THE INVENTION

The heat dissipated by today's computing equipment is reaching levels that make it very challenging to cool these systems in densely packed data centers or telecommunications rooms. In data centers, the computing equipment, such as a multitude of computer servers, are commonly placed in a series of racks arranged in a series of aisles in the data center. Typically, a data center has a cooling system that, e.g., by way of one or more air conditioning units (ACUs), introduces cooled air to the racks, for example, through a sub-floor plenum and associated perforated tiles in the floor above the sub-floor plenum. Without a proper layout in the data center, costly inefficiencies in the cooling system inevitably occur, and can potentially result in ineffective cooling of the equipment.

Air flow distributions within a data center have a major impact on the thermal environment of the equipment within the data center. Computational fluid dynamics (CFD) calculations have been used to solve the Navier Stokes (NS) Equations and the modeling results of the NS-CFD have been employed to thermally manage data centers. There can be, however, several potential problems associated with NS-CFD modeling of a data center. First, while NS-CFD modeling has been successfully deployed for the design of very well-defined structures, such as air plane wings, the application of NS-CFD modeling to data centers can be somewhat problematic because input data needed for NS-CFD modeling is often not available and/or is inaccurate. Namely, every data center is different and a current inventory list is often not available for each data center (further, heterogeneous technology may be used within a given data center, e.g., computer equipment from different vendors and/or of different vintages), available data (e.g., name-plate power and flow data) generally does not reflect actual usage, air flow is very difficult and time-consuming to accurately measure and characterize (and often does not capture room effects such as drafts). In all, it could easily take one person at least one week to survey a 5,000 square foot data center, which is an overly time-consuming process.

Second, a data center NS-CFD model can be difficult to generate and typically requires a detailed survey of the data center, which is a time consuming and costly process (as described above). However, even if a complicated NS-CFD model has been built, there is very little confidence that it actually gives dependable insights, because, as described above, the input data for the NS-CFD model is often not available and/or does not accurately represent the data center.

Third, the calculations involved are time-consuming (slow) and besides many assumptions, which are intrinsically built into these NS-CFD models (i.e., with CFD and other related models such as the k-epsilon turbulence model, uniform air flow rate through server rack and uniform volumetric heat generation inside of the server rack are assumed) such models cannot readily include spatial and temporal variability in the workload, as well as other unknowns, because the pure computation time of these models is quite significant.

Fourth, existing data center NS-CFD models cannot easily be used to optimize data center layout. Namely, there is no systematic strategy for changing inputs to the model based on measurements. Rather, data center optimization is done today rather unscientifically "by hand" playing a few what-ifs, e.g., where an engineer looks at results and uses his/her intuition to adjust the model.

Therefore, data center modeling techniques are needed that provide improved accuracy and efficiency over conventional processes so as to permit optimization of data center layout.

SUMMARY OF THE INVENTION

The present invention provides techniques for modeling a data center. In one aspect of the invention, a method for modeling a data center is provided. The method comprises the following steps. Spatially dense three-dimensional thermal distribution and air flow measurements made in the data center using a mobile off-line surveying system are obtained. A temperature and air flow model for the data center is created using the spatially dense three-dimensional thermal distribution and air flow measurements. The temperature and air flow model is used to make thermal distribution and air flow predictions of the data center. The thermal distribution and air flow predictions are compared with the thermal distribution and air flow measurements made using the mobile off-line surveying system to produce a validated model for the data center.

It can then be determined whether a margin of error between the thermal distribution and air flow predictions and the thermal distribution and air flow measurements is acceptable. One or more changes can be made to the temperature and air flow model if the margin of error between the thermal distribution and air flow predictions and the thermal distribution and air flow measurements is unacceptable. The use, compare and determine steps can be repeated until the margin of error between the thermal distribution and air flow predictions and the thermal distribution and air flow measurements is acceptable.

A more complete understanding of the present invention, as well as further features and advantages of the present invention, will be obtained by reference to the following detailed description and drawings.

DETAILED DESCRIPTION OF PREFERRED EMBODIMENTS

Figure 1:
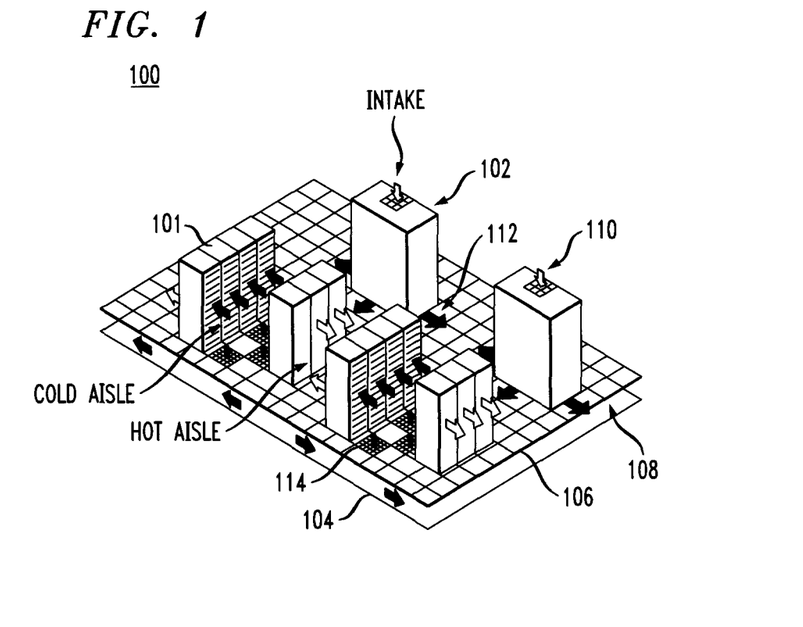
FIG. 1 is a diagram illustrating an exemplary data center according to an embodiment of the present invention.

FIG. 1 is a diagram illustrating exemplary data center 100. Data center 100 has information technology (IT) racks 101 and a raised-floor cooling system with air conditioning units (ACUs) 102 (also referred to herein as computer room air conditioners (CRACs), see below) that take hot air in (typically from above through one or more air returns in the CRACs) and exhaust cooled air into a sub-floor plenum below. Hot air flow through data center 100 is indicated by light arrows 110 and cooled air flow through data center 100 is indicated by dark arrows 112.

In FIG. 1, IT racks 101 use front-to-back cooling and are located on raised-floor 106 with sub-floor 104 beneath. Namely, according to this scheme, cooled air is drawn in through a front (inlet) of each rack and warm air is exhausted out from a rear (outlet) of each rack. The cooled air drawn into the front of the rack is supplied to air inlets of each IT equipment component (servers for example) therein. Space between raised floor 106 and sub-floor 104 defines the sub-floor plenum 108. The sub-floor plenum 108 serves as a conduit to transport, e.g., cooled air from the ACUs 102 to the racks. In a properly-organized data center (such as data center 100), racks 101 are arranged in a hot aisle-cold aisle configuration, i.e., having air inlets and exhaust outlets in alternating directions. Namely, cooled air is blown through perforated floor tiles 114 in raised-floor 106, from the sub-floor plenum 108 into the cold aisles. The cooled air is then drawn into racks 101, via the air inlets, on an air inlet side of the racks and dumped, via the exhaust outlets, on an exhaust outlet side of the racks and into the hot aisles.

The ACUs typically receive chilled water from a refrigeration chiller plant (not shown). Each ACU typically comprises a blower motor to circulate air through the ACU and to blow cooled air, e.g., into the sub-floor plenum. As such, in most data centers, the ACUs are simple heat exchangers mainly consuming power needed to blow the cooled air into the sub-floor plenum.

Typically, one or more power distribution units (PDUs) (not shown) are present that distribute power to the IT equipment racks 101. As will be described in detail below, power consumption by the PDUs can be an important consideration in the present techniques. In general, since the PDUs supply electrical power required by the IT equipment in a data center, a total electrical power intake of the PDUs represents an important parameter in determining the energy efficiency of a data center.

Figure 2:
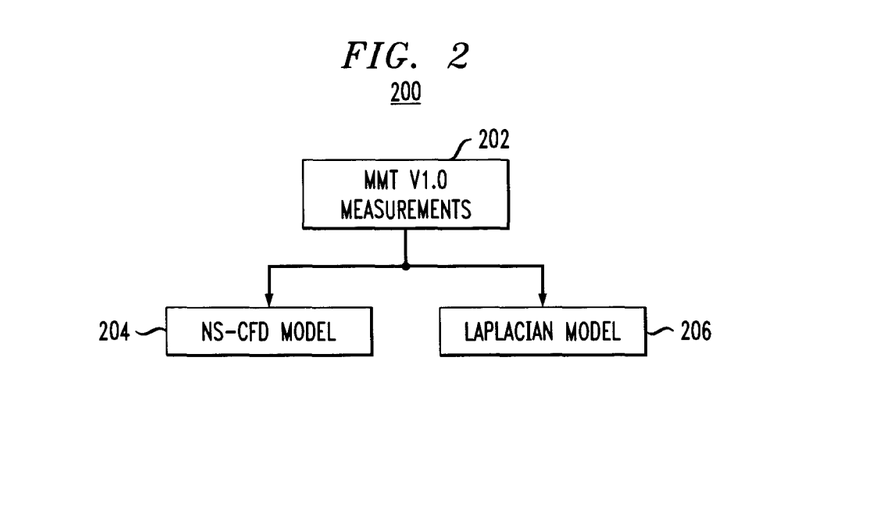
FIG. 2 is a diagram illustrating an exemplary methodology for creating a temperature/air flow model for a data center according to an embodiment of the present invention.

FIG. 2 is a diagram illustrating exemplary methodology 200 for creating a temperature and air flow model for a data center. In step 202, spatially dense three-dimensional thermal distribution and air flow measurements are made in the data center, which will serve as input data for creating the model. According to an exemplary embodiment, the three-dimensional thermal distribution and air flow measurements are made using a mobile off-line surveying system (MOSS), such as mobile measurement technology (MMT) V1.0 (for example, MMT V1.0 temperature measurements are spatially dense, e.g., typically spaced about eight inches apart from one another in x, y lateral dimensions and about 12 inches apart from one another in z dimensions). MMT V1.0 is described in U.S. Pat. No. 7,366,632, issued to Hamann et al., entitled "Method and Apparatus for Three-Dimensional Measurements" (hereinafter "U.S. Pat. No. 7,366,632") the contents of which are incorporated by reference herein. MMT V1.0 is a technology for optimizing data center infrastructures for improved energy and space efficiency which involves a combination of advanced metrology techniques for rapid measuring/surveying data centers (see, for example, U.S. Pat. No. 7,366,632) and metrics-based assessments and data-based best practices implementation for optimizing a data center within a given thermal envelope for optimum space and most-efficient energy utilization (see, for example, U.S. application Ser. No. 11/750,325, filed by Claassen et al., entitled "Techniques for Analyzing Data Center Energy Utilization Practices," the contents of which are incorporated by reference herein).

The measurements gathered from MMT V1.0 are an excellent starting point for building a data center model. The MMT V1.0 measurements not only provide necessary physical parameters for the model input but also allow for direct validation and correction (e.g., if the initial model predictions disagree with measured temperature/air flow measurements, as described in detail below). For example, an actual data center floor plan (many data center managers do not have a current floor plan) can be readily deduced from the MMT V1.0 measurements as MMT V1.0 is equipped with a positioning tracking system, see U.S. Pat. No. 7,366,632.

As highlighted above, some conventional approaches involve models that use inputs, such as air flow and power. With one common approach, data center thermal and air flow modeling involves solving Navier-Stokes (NS) equations for irrotational flow ($\nabla \times \vec{v} = 0$) using intensive computational fluid dynamics calculations, which can comprise as many as five coupled (non-linear) partial differential equations (one for conservation of mass, three for momentum conservation and one for conservation of energy). Using a description of the fluid or gas (such as the ideal gas law which relates pressure p and temperature T) there are six equations for six unknowns (p, $v_x$, $v_y$, $v_z$, T, $\rho$) with four variables x, y, z, t (see below). In order to solve these equations, Navier-Stokes-computational fluid dynamics (NS-CFD) simulations are typically used, i.e., CFD is used to obtain numerical solutions.

The NS computations can be carried out as follows:

$$\frac{\partial \rho}{\partial t} + div(\rho \underline{v}) = 0,$$

$$\frac{\partial \underline{v}}{\partial t} + \underline{v} div(\rho \underline{v}) = -\frac{1}{\rho} grad(p) + \frac{v}{\rho} grad(div(\underline{v})) + E,$$

$$\rho c_p \underline{v} \left( \frac{\partial T}{\partial t} + grad(T) \right) + div(k grad(T)) + p div(v) + h + v\Phi + \rho c_p \frac{\partial p}{\partial t} = 0,$$

Figure 9:
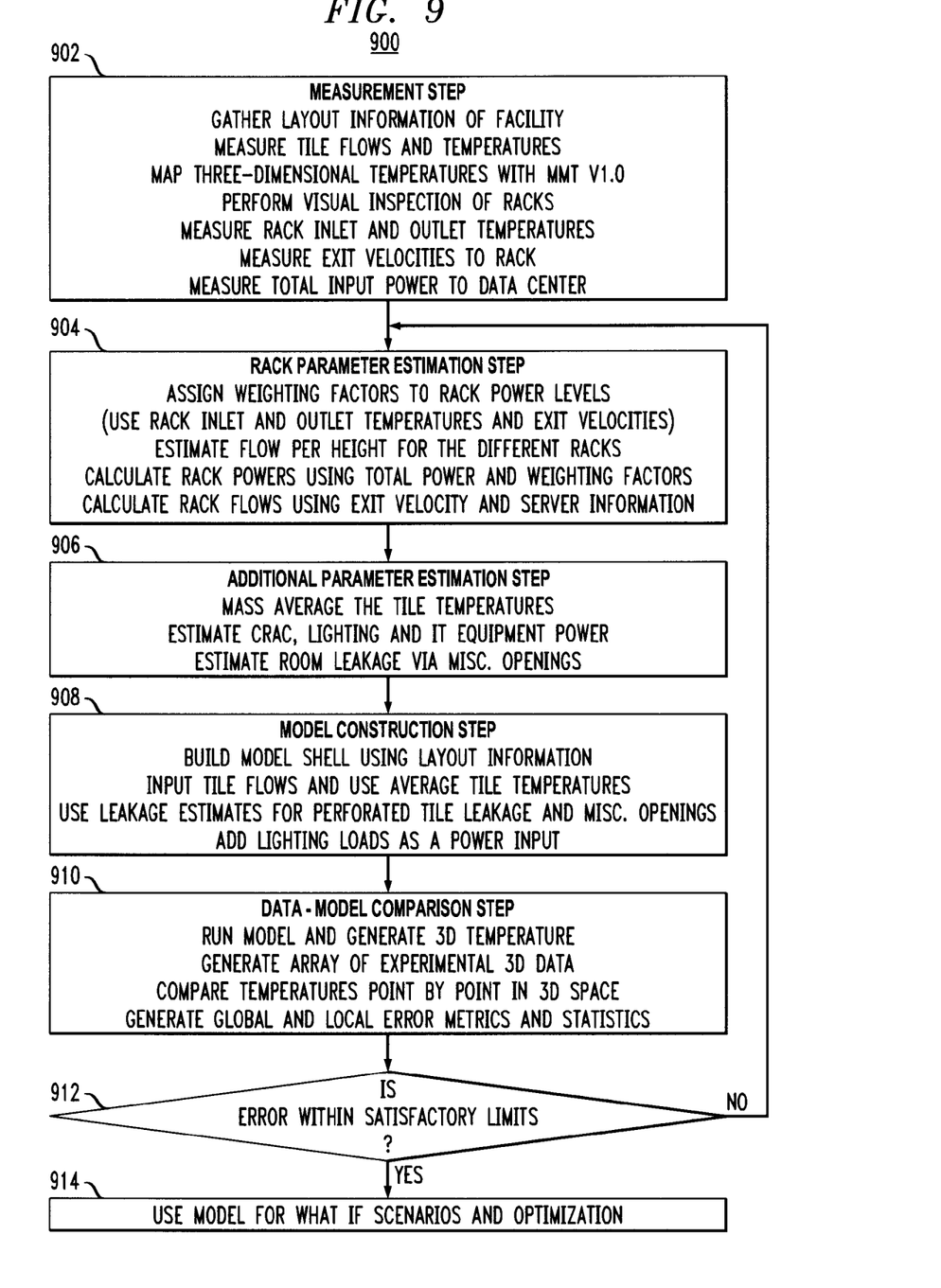
FIG. 9 is a diagram illustrating an exemplary methodology for creating a temperature flow model using mobile measurement technology according to an embodiment of the present invention.

-continued $$\rho(P, T) = \frac{Mp}{RT},$$

$$\nabla \times \vec{v} = 0,$$

wherein $C_p$ is specific heat, $\rho$ is air density, $v$ is velocity vector, $\upsilon$ is viscosity, F is external force, M is molar mass, $\Phi$ is viscous dissipation function, h is power dissipation/heat removal, T is absolute temperature, t is time, p is absolute pressure of medium (e.g., air) and R is the universal gas constant. According to one exemplary embodiment, in step 204, the MOSS, e.g., MMT V1.0, three-dimensional thermal distribution and air flow measurements are used in the NS-CFD calculations to provide a temperature and air flow model for the data center. The creation of a NS-CFD model using MMT V1.0 measurements is described, for example, in conjunction with the description of FIG. 9, below, and in Y. Amemiya et al., "Comparison of Experimental Temperature Results with Numerical Modeling Predictions of a Real-World Compact Data Center Facility," Proceedings of IPACK2007 ASME InterPACK '07 (July 2007) (hereinafter "Amemiya"), the contents of which are incorporated by reference herein.

However, by way of the present teachings it has been discovered that since the thermal distribution and air flow measurements taken using, for example, MMT V1.0 are spatially dense (as described above), certain assumptions can be made about conditions in the data center. According to an exemplary embodiment, it is assumed that there is an irrotational velocity field, no turbulence, constant density, free slipping over boundaries (slipless) and viscous forces are much less than inertial forces (i.e., viscous forces can be neglected). By way of these assumptions, the Navier-Stokes equations (shown above) can be simplified as follows (wherein a slash indicates the cancellation of a term), $$\frac{\partial \rho}{\partial t} + div(\rho \underline{v}) = 0,$$

$$\frac{\partial \underline{v}}{\partial t} + \underline{v} div(\rho \underline{v}) = -\frac{1}{\rho} grad(p) + \frac{v}{\rho} grad(div(\underline{v})) + F,$$

$$\rho c_p \underline{v} \left( \frac{\partial T}{\partial t} + grad(T) \right) + div(k grad(T)) +$$

$$p div(v) + h + v\Phi + h + v\Phi + \rho c_p \frac{\partial p}{\partial t} = 0,$$

$$\rho(P, T) = \frac{Mp}{RT}, \nabla \times \vec{v} = 0.$$

As such, terms $$\frac{\partial \rho}{\partial t}, \frac{\partial \underline{v}}{\partial t}, -\frac{1}{\rho} grad(p), \frac{v}{\rho} grad, E, \frac{\partial T}{\partial t}, v\Phi, \rho c_p \frac{\partial p}{\partial t} \text{ and } \frac{Mp}{RT}$$

can be cancelled.

With zero divergence (volume conservation), i.e., $\nabla v=0$, and zero rotation, i.e., $v=\nabla\phi$, the above simplified equations provide a temperature and air flow model for the data center, i.e., $$\nabla^2 \phi = 0 \tag{1}$$

$$\rho c_p \underline{v} grad(T) + div(k\ grad(T)) + h = 0, \tag{2}$$

wherein $\nabla^2\phi=0$ (i.e., $$\nabla^2 \phi = \frac{\partial^2 \phi}{\partial x^2} + \frac{\partial^2 \phi}{\partial y^2} + \frac{\partial^2 \phi}{\partial z^2} = 0,$$

see description of potential flow theory, below) is an air flow field and $\rho c_p v grad(T)+div(k\ grad(T))+h=0$ is a temperature field (wherein $\rho$ is air density, $c_p$ is specific heat, v is velocity vector, T is absolute temperature, h is power dissipation/heat removal and k is thermal conductivity). Thus, according to another exemplary embodiment, in step 206, MOSS, e.g., MMT V1.0, measurements are used to create a model based on Equations 1 and 2 (see description below). Within Equation 2 (temperature equation), the term $\rho c_p v grad(T)$ represents convection, the term $div(k\ grad(T))$ represents conduction and the term h, i.e., power dissipation/heat removal, collectively represents heat generation. This new model is referred to herein as a "Laplacian model" because it uses a Laplace-type of equations. As highlighted above, in the Laplacian model air flow modeling is separated from temperature modeling which keeps the Laplacian model linear (non-coupled) (meaning that two solutions can be superimposed to yield a third solution). As will be described in detail below, the Laplacian model can be coupled directly to the MMT V1.0 measurements yielding a benchmarked data center model. In fact, the Laplacian model can be completely based on measured input data, which is readily and rapidly available through MMT V1.0.

Specifically, potential flow theory is employed assuming constant (temperature independent) air density, free slipping over boundaries and that viscous forces can be neglected, i.e., $$\nabla^2 \phi = \frac{\partial^2 \phi}{\partial x^2} + \frac{\partial^2 \phi}{\partial y^2} + \frac{\partial^2 \phi}{\partial z^2} = 0, \text{ and}$$

$$v_x = \frac{\partial \phi}{\partial x}, v_y = \frac{\partial \phi}{\partial y}, v_z = \frac{\partial \phi}{\partial z},$$

wherein $\phi$ is flow potential and $v_x$, $v_y$ and $v_z$ are air flow velocity components in x, y and z directions, respectively. Equation 1 (air flow equation) above cannot be solved without applying the correct boundaries. In the present teachings, e.g., MMT V1.0, supplies these boundaries as measurements which advantageously can be fed directly into the model. For example, the perforated tiles (or output of the CRACs) are sources $$\left( e.g., \frac{\partial \phi}{\partial z} = -(measured) \text{ output air flow from a perforated tile} \right)$$

and the air returns to the CRACs can be sinks $$\left( e.g., \frac{\partial \phi}{\partial z} = +(measured)\ CRAC \text{ air flows} \right),$$

while the racks are sinks $$\left( e.g., \frac{\partial \phi}{\partial x} = -(measured) \text{ outlet rack air flow} \right)$$

at the inlet(s) and sources $$\left(\text{e.g., } \frac{\partial \phi}{\partial x} = +\text{(measured) inlet rack air flow}\right)$$

at the outlet(s).

In order to solve Equation 1, an actual relative value for the flow potential φ=0 has to be set somewhere in the data center. In some cases, it may be desirable to set the flow potential to zero at the air returns of the CRACs (i.e., assuming an infinite sink) or in an area where it can accurately be assumed that that there is minimal air velocity, such as behind one of the CRACs. All of the source and sink flow boundaries can be obtained directly from the MMT V1.0 measurements, and thus the air flow field as described by Equation 1 can be solved. Specifically, the MMT V1.0 measurements define "flow boundaries" of Equation 1. Outer parts of the modeling domain, such as the data center walls and ceiling, have natural boundaries as is commonly applied in partial differential equation problems.

In general, with any of the data center models described herein, the inputs can include, but are not limited to, the perforated tile air flow rates and temperature, the rack heat loads (i.e., power dissipated by the IT racks, which is equal to the power consumed by the racks to perform computational work) and (inlet/outlet) air flow rates, the CRACs air flow rates (which is equivalent to supplied cool air flow rate or return hot air rate), as well as several other miscellaneous parameters. These miscellaneous parameters can include, but are not limited to, tile perimeter leakage flow rates, location of cable openings (which can serve as air passages, e.g., into/out of the racks/the data center) and/or direction of CRAC(s) air flow. See, for example Amemiya.

Although neglected in this implementation, a temperature dependence of the air density can be included by taking the MMT V1.0 thermal measurements into account and by subsequently superimposing a density driven air velocity (Bernoulli's law). Another more simplified approach would be to simply superimpose an up-drift velocity (in a z-direction) for a temperature difference between a bottom and a top of the data center.

An actual thermal distribution T (x, y, z) can then be calculated based on the assumption that all heat transport within the data center is governed simply by mass transport (diffusivity α=0). However, in principle, thermal conduction through air can be included in the calculations. By excluding the power dissipation/heat removal term h in Equation 2 (the temperature equation) above, Equation 2 can be re-written as follows:

$$\frac{\partial}{\partial x}\left[\alpha \frac{\partial T}{\partial x} - v_x T\right] + \frac{\partial}{\partial y}\left[\alpha \frac{\partial T}{\partial y} - v_y T\right] + \frac{\partial}{\partial z}\left[\alpha \frac{\partial T}{\partial z} - v_z T\right] = 0. \quad (3)$$

Again, Equation 3 cannot be solved without applying the appropriate boundaries, which are directly available from the MMT V1.0 measurements (which measures the inlet and outlet temperatures for each rack). These inlet and outlet temperatures can be directly applied as boundaries to Equation 3, and thus the remaining temperature field can be solved. Alternatively, in combination with the flow boundaries across each rack and CRAC, an actual heat dissipation can be calculated (i.e., $h=\rho c_p v(T_{out}-T_{in})$) and Equation 2 can be used to calculate the temperature field. As highlighted above, it can be assumed that the air density, as well as the specific heat, are temperature independent. However, because the thermal distribution is known from the MMT V1.0 measurements, this can be corrected, for example, by taking a difference, i.e., define a spatial offset in temperature, between the calculated temperature field and the measured temperature field (MMT V1.0). This difference (T is offset) can then be applied for prediction using the Laplacian model. The actual equations are solved using standard partial differential equation solvers.

Thus, as described above, the actual MMT V1.0 measurements can be used to set boundaries in the present data center models. Because the Laplacian model is based solely on experimental data, the Laplacian model represents critical temperatures (i.e., at the inlets and outlets) in the data center accurately. Simple what-ifs can then be tried out with the model. For example, a new temperature and air flow distribution can be calculated for different air flow rates and/or different power consumptions within the racks.

Figure 3:
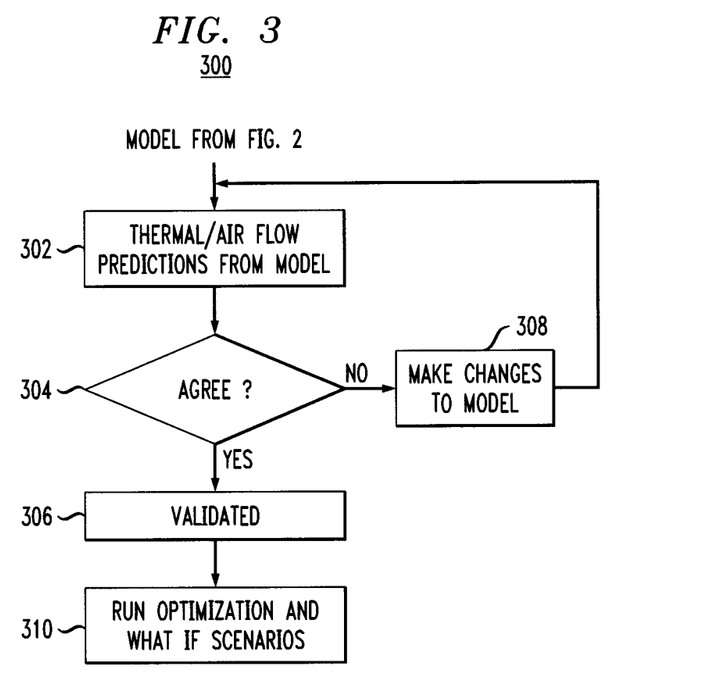
FIG. 3 is a diagram illustrating an exemplary methodology for validating and using the present temperature/air flow models according to an embodiment of the present invention.

As highlighted above, the Laplacian model predicts the critical temperatures (i.e., at the inlets and outlets) correctly. The remainder of the predicted thermal distribution can then be easily validated with the MMT V1.0 measurements, as described below. FIG. 3 is a diagram illustrating exemplary methodology 300 for validating and using the present temperature and air flow models. As described in conjunction with the description of methodology 200 of FIG. 2, above, the temperature and air flow model(s) created using the MOSS, e.g., MMT V1.0, measurements can be a NS-CFD model and/or a Laplacian model. In step 302, the model (NS-CFD or Laplacian) is used to predict a thermal distribution and air flow in the data center. In step 304, the thermal distribution and air flow predictions from the model are compared to the corresponding data collected using MMT V1.0, which according to an exemplary embodiment includes calculating error via simple subtraction and/or by means of any suitable statistical metric(s) to quantify the accuracy of the model. Namely, if it is determined that the thermal distribution and air flow values predicted by the model align with the MMT V1.0 measurements to within an acceptable margin of error, then in step 306 the model is considered validated. On the other hand, if it is determined that a margin of error between the thermal distribution and air flow values predicted by the model and the MMT V1.0 measurements is unacceptable, then in step 308 one or more changes are made to the model. For example, if the calculated temperature distribution does not agree with predicted temperature distribution, a three-dimensional array with difference (an error correction array) can be calculated. This array can then be used to correct future predictions. If desired, the error correction array can be parameterized.

The model predictions are then again compared with the MMT V1.0 measurements. These steps can be repeated until a validated model is achieved. By way of example only, a margin of error of from about 10 percent (%) to about 30% may be used for the purposes of validating the present data center models. The validated model is considered herein as a "benchmarked" model in that it now can be used to optimize the data center. Namely, in step 310, once the model is validated it can be used for simulating "what if" scenarios and design optimizations for the data center.

For example, the Laplacian model can be used to predict an impact of changes in the data center, i.e., racks being moved and/or equipment being edited. In this case, one would add the additional equipment, i.e., more IT racks containing servers (or other IT equipment) and/or more CRAC units, with the appropriate boundaries. Name plate data (or discounted name plate data) might be used to specify the boundaries. Then, Equation 1 and either Equation 2 or Equation 3 are solved to predict the complete temperature field. In contrast, conventional NS-CFD models use name plate data for only a small portion of a data center. Further, the present Laplacian model will also have significantly faster calculation times, as compared to NS-CFD-based models.

The Laplacian model predictions are assumed to be very accurate because a comparatively larger portion of the data center is measured in detail using MMT V1.0 (as compared to conventional data center analysis techniques). A benchmarked model based on the MMT V1.0 measurements thus represents the data center very accurately. If an error correction array was constructed in the initial Laplacian model, then the error correction array can be applied to the predictions in the changed data center environment.

While the initial boundaries for the Laplacian model are obtained by MMT V1.0 measurements, other forms of data gathering are also possible. For example, even NS-CFD results can be used to define the boundaries in the Laplacian model (which can then be solved for the remaining temperature field).

The present techniques provide several advantages over conventional NS-CFD techniques. First, the data center models described herein can, as described in detail above, be coupled directly to the MMT V1.0 measurements. By comparison, standard NS-CFD models require input data that is generally very difficult to accurately obtain for real-life data centers (input powers etc.). Namely, in many instances, with standard NS-CFD models the input data is either incomplete or inaccurate and thus the resulting model does not yield predictions that are commensurate with measured values.

Second, the present model can be used to obtain linear response matrixes for several important parameters within the data center (e.g., perforated tile air flows, CRAC air flows, rack (inlet/outlet air flows and power levels), which can be exploited for data center optimization and/or rapid computation. For example, the present models can be used to calculate temperature fields for each server in a data center. The superposition of these temperature fields weighted with individual power levels in each server gives temperature distributions within the data center, as follows:

$$\underline{A} \cdot \underline{P^{server}} = \underline{T^{server}}, \quad (4)$$

herein A represents a matrix relating to a power for each server $\overline{P}_i^{server}$ with corresponding (inlet) temperatures $T_i^{server}$. $\underline{T^{server}}$ is a temperature vector of these (inlet) temperatures ($T^{server} = [T_i^{server}]$ for i=1, ..., n=number of servers), while $\underline{P^{server}}$ is a power vector for each server inlet temperature ($P^{server} = [P_i^{server}]$ for i=1, ..., n=number of servers).

Figure 4:
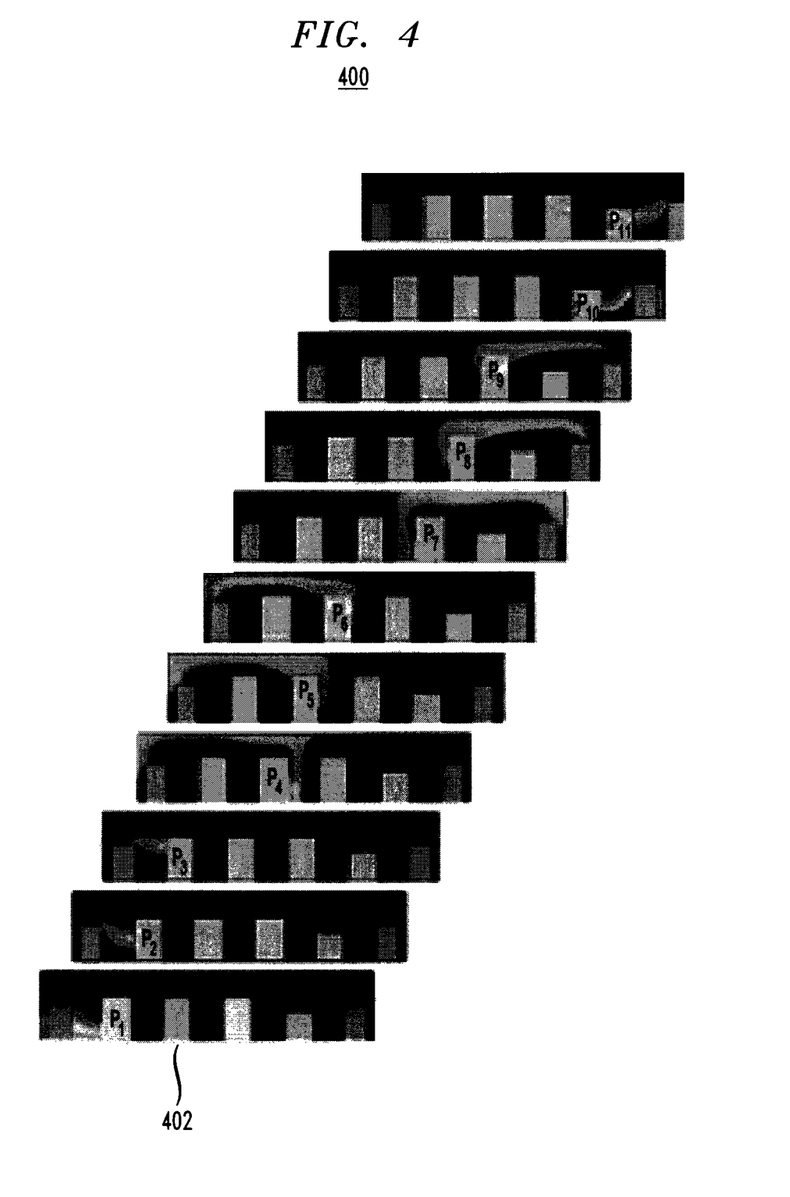
FIG. 4 is a diagram illustrating air temperature contours and flow profiles resulting from use of a temperature and air flow model on an exemplary data center according to an embodiment of the present invention

FIG. 4 is a diagram illustrating air temperature contours and flow profiles resulting from use of a temperature and air flow model on a data center 400. Namely, data center 400 contains n=11 rows of servers 402, each server 402 has a power level $P_i^{server}$. By using Laplacian modeling a temperature field and corresponding inlet temperatures can be calculated for each server power level.

Any linear superposition of the 11 temperature fields shown in FIG. 4 yields a valid new solution for any set of power levels in the data center. Specifically, Equation 4, above, can be used to rapidly predict temperatures for any combination of power levels. The A matrix is defined by these 11 solutions. For example, the matrix can be obtained by:

$$\underline{A} = \begin{pmatrix} T_1^{server}/P_1^{server} & \cdots & T_1^{server}/P_n^{server} \\ \vdots & & \vdots \\ T_n^{server}/P_1^{server} & \cdots & T_n^{server}/P_n^{server} \end{pmatrix}.$$

By applying simple linear and non-linear least square fitting an optimum power distribution (i.e., to attain an optimum air inlet temperature distribution) for the data center can be obtained. Specifically, an optimum temperature distribution in the data center might be specified, and then Equation 4 can be used to obtain the optimum power distribution. See, for example, U.S. Patent Application No. 2007/0098037 filed by Hamann et al., entitled "Techniques for Distributing Power in Electronic Circuits and Computer Systems," the contents of which are incorporated by reference herein. The same concept can be used to obtain the optimum perforated tile layout in the data center. For example, the present model can be used to calculate air flow fields for each perforated tile in the data center. The superposition of these air flow fields weighted with a supplied air flow from each perforated tile ($v_p$) can yield temperatures within the data center as follows:

$$\underline{F}\underline{v_p} = \underline{T} \quad (5)$$

wherein F represents a linear response matrix between perforated tile air flow vector $v_p$ and temperature T. By solving Equation 5 for $v_p$ with an optimum temperature distribution T (e.g., using linear or no-linear least square fits) an optimum perforated tile distribution (i.e., how much air flow needs to supplied and to where) for the data center can be obtained.

Figure 5:
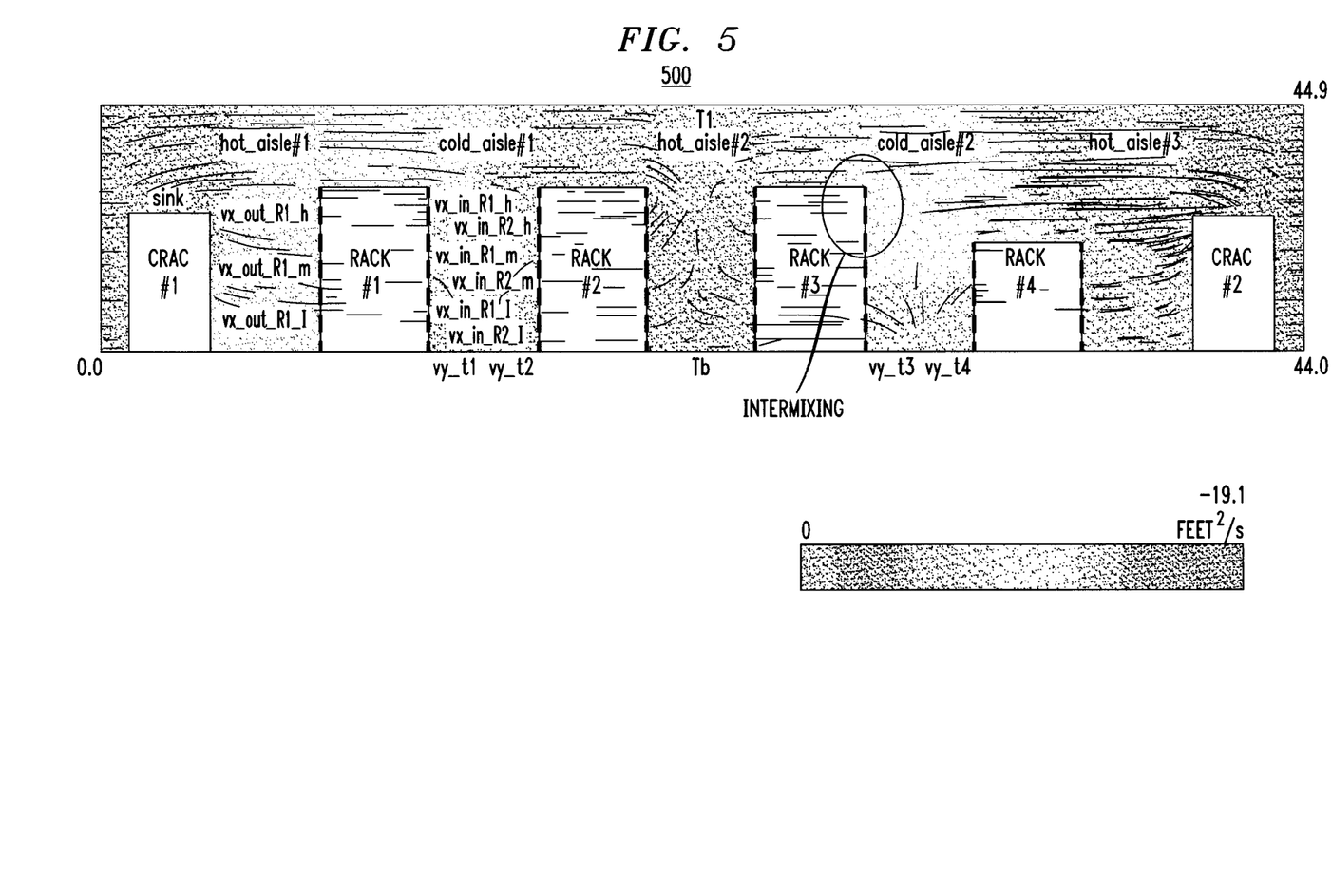
FIG. 5 is a diagram illustrating air flow potential and field in an exemplary data center according to an embodiment of the present invention.

By way of example, Equation 1, above, can be applied to the air flow field of a data center (e.g., data center 500 of FIG. 5, described below), as follows:

Perforated tile (source): $\dfrac{\partial \phi}{\partial y} = -v_y$,

CRACs(sink): $\phi = 0$,

Inlet of rack: $\dfrac{\partial \phi}{\partial x} = v_x$,

Outlet of rack: $\dfrac{\partial \phi}{\partial x} = -v_x$.

FIG. 5 is a diagram illustrating air flow potential and field in exemplary data center 500. As shown in FIG. 5, data center 500 includes four racks (labeled "RACK #1" through "RACK #4") and two CRACs (labeled "CRAC #1" and "CRAC #2"). Between CRAC #1 and RACK #1 is a hot aisle (labeled "hot aisle #1"), between RACK #1 and RACK #2 is a cold aisle (labeled "cold aisle #1"), between RACK #2 and RACK #3 is another hot aisle (labeled "hot aisle #2"), between RACK #3 and RACK #4 is another cold aisle (labeled "cold aisle #2") and between RACK #4 and CRAC #2 is yet another hot aisle (labeled "hot aisle #3"). In hot aisle #1, the outlet air flow of RACK #1 is designated at three levels of the rack, high, medium and low, i.e., $v_x$_out_R1_h, $v_x$_out_R1_m and $v_x$_out_R1_1, respectively. In cold aisle #1, the inlet air flows of RACK #1 and RACK #2 are designated at three levels of the racks, high, medium and low, i.e., $v_x$_in_R1_h, $v_x$_in_R1_m and $v_x$_in_R1_1, for RACK #1, and $v_x$_in_R2_h, $v_x$_in_R2_m and $v_x$_in_R2_1, for RACK #2, respectively. Hot and cold air intermixing can occur in cold aisle #2, as shown.

Figure 6:
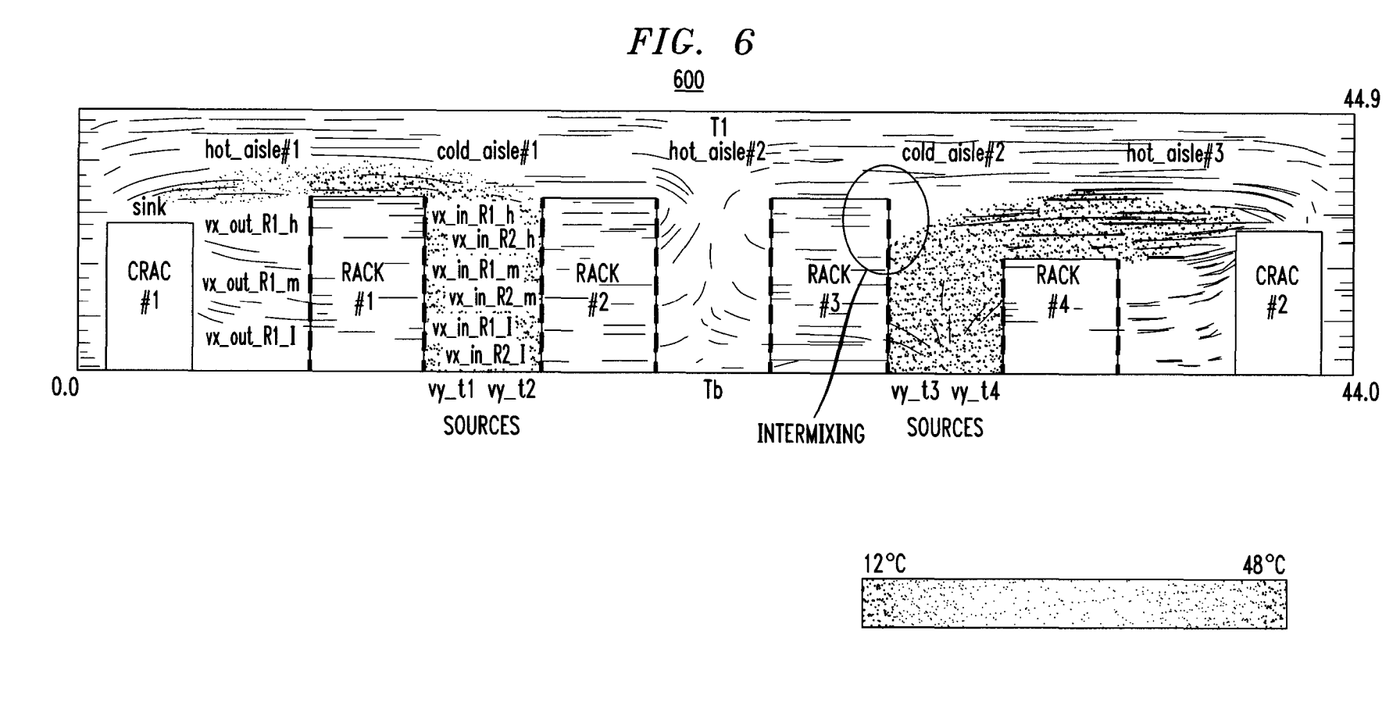
FIG. 6 is a diagram illustrating temperature field in an exemplary data center according to an embodiment of the present invention.

By way of example, Equation 2, above, can be applied to the temperature field of a data center (e.g., data center 600 of FIG. 6). FIG. 6 is a diagram illustrating temperature field in exemplary data center 600. As shown in FIG. 6, data center 600 includes four racks (labeled "RACK #1" through "RACK #4") and two CRACs (labeled "CRAC #1" and "CRAC #2"). Between CRAC #1 and RACK #1 is a hot aisle (labeled "hot aisle #1"), between RACK #1 and RACK #2 is a cold aisle (labeled "cold aisle #1"), between RACK #2 and RACK #3 is another hot aisle (labeled "hot aisle #2"), between RACK #3 and RACK #4 is another cold aisle (labeled "cold aisle #2") and between RACK #4 and CRAC #2 is yet another hot aisle (labeled "hot aisle #3"). In hot aisle #1, the outlet air flow of RACK #1 is designated at three levels of the rack, high, medium and low, i.e., $v_x\_out\_R1\_h$, $v_x\_out\_R1\_m$ and $v_x\_out\_R1\_l$, respectively. In cold aisle #1, the inlet air flows of RACK #1 and RACK #2 are designated at three levels of the racks, high, medium and low, i.e., $v_x\_in\_R1\_h$, $v_x\_in\_R1\_m$ and $v_x\_in\_R1\_l$, for RACK #1, and $v_x\_in\_R2\_h$, $v_x\_in\_R2\_m$ and $v_x\_in\_R2\_l$, for RACK #2, respectively. Hot and cold air intermixing can occur in cold aisle #2, as shown.

The boundaries used in this example are 200 Watts (W) per server (i.e., for RACK #1, RACK #2 and RACK #3 there are three servers per rack, so the rack heat load is 600 W each; for RACK #4 there are two servers per rack so the rack heat load is 400 W (for a total heat load of 2,200 W for all of the racks)) and a temperature discharged by the perforated tiles of 12 degrees Celsius (° C.). The greatest server inlet temperature is 25° C. Total power is 2,200 W and total input flow is 1,200 cubic feet per minute (cfm).

Figure 7:
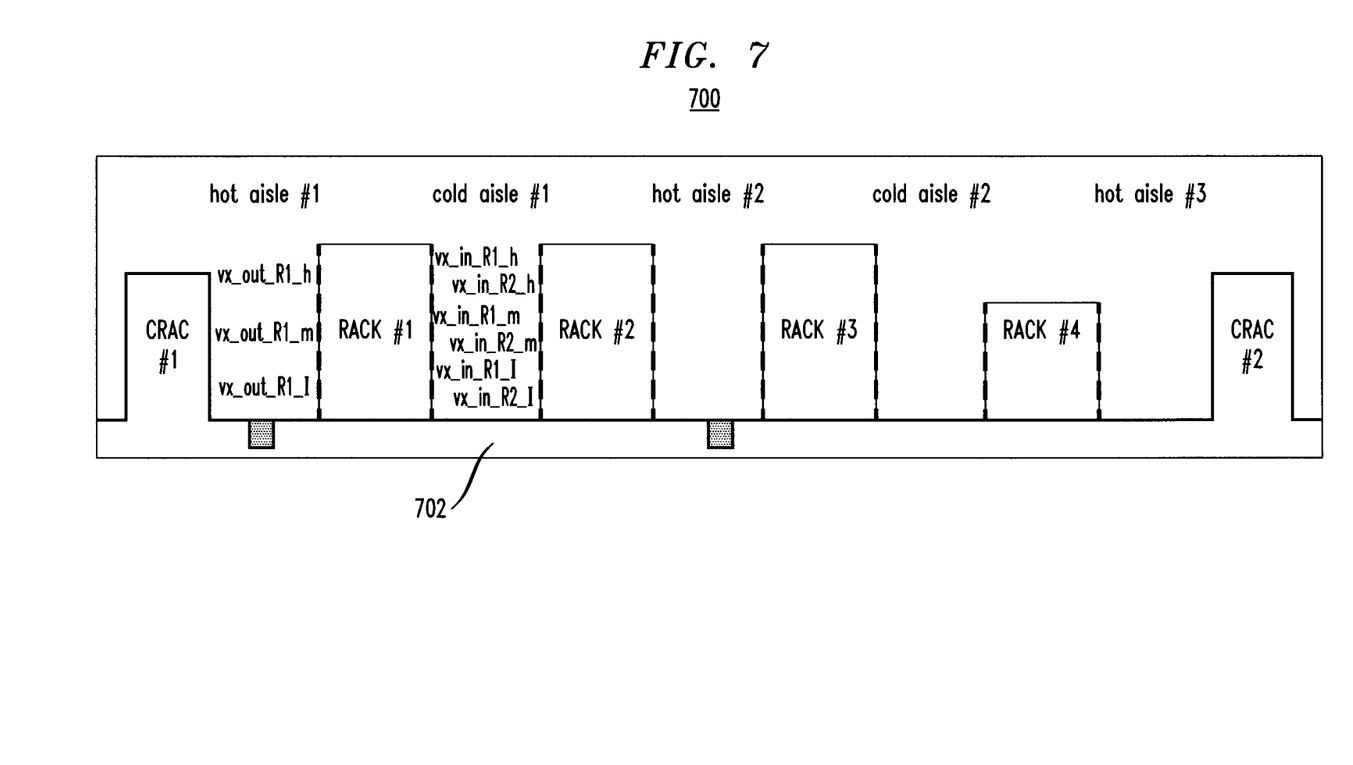
FIG. 7 is a diagram illustrating an exemplary data center having a sub-floor plenum according to an embodiment of the present invention.

As described above, a data center can have a sub-floor plenum. By way of example, Equations 1 and 2, above, can accommodate sub-floor plenum modeling and other effects in a data center (e.g., data center 700 of FIG. 7, described below), as follows:

$$\text{Inlet of } CRACs: \frac{\partial \phi}{\partial x} = v_x,$$

$$\text{Outlet of } CRACs: \frac{\partial \phi}{\partial x} = -v_x,$$

$$\rho c_p v grad(T) + div(k grad(T)) + h_{Racks} - h_{CRACs} = 0$$

FIG. 7 is a diagram illustrating exemplary data center 700 having sub-floor plenum 702. As shown in FIG. 7, data center 700 includes four racks (labeled "RACK #1" through "RACK #4") and two CRACs (labeled "CRAC #1" and "CRAC #2"). Between CRAC #1 and RACK #1 is a hot aisle (labeled "hot aisle #1"), between RACK #1 and RACK #2 is a cold aisle (labeled "cold aisle #1"), between RACK #2 and RACK #3 is another hot aisle (labeled "hot aisle #2"), between RACK #3 and RACK #4 is another cold aisle (labeled "cold aisle #2") and between RACK #4 and CRAC #2 is yet another hot aisle (labeled "hot aisle #3"). In hot aisle #1, the outlet air flow of RACK #1 is designated at three levels of the rack, high, medium and low, i.e., $v_x\_out\_R1\_h$, $v_x\_out\_R1\_m$ and $v_x\_out\_R1\_l$, respectively. In cold aisle #1, the inlet air flows of RACK #1 and RACK #2 are designated at three levels of the racks, high, medium and low, i.e., $v_x\_in\_R1\_h$, $V_x\_in\_R1\_m$ and $v_x\_in\_R1\_l$, for RACK #1, and $v_x\_in\_R2\_h$, $v_x\_in\_R2\_m$ and $v_x\_in\_R2\_l$, for RACK #2, respectively. Sub-floor plenum 702 is present beneath the racks/CRACs.

Figure 8:
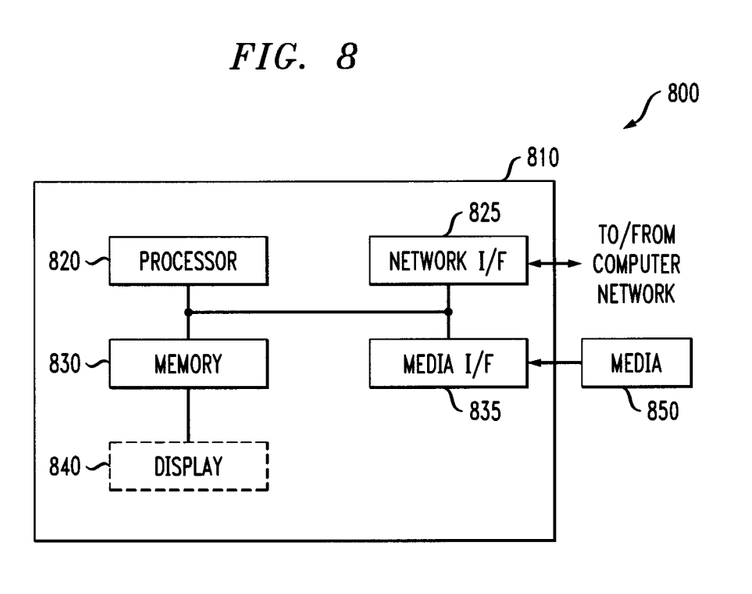
FIG. 8 is a diagram illustrating an exemplary apparatus for modeling a data center according to an embodiment of the present invention.

Turning now to FIG. 8, a block diagram is shown of an apparatus 800 for modeling a data center, in accordance with one embodiment of the present invention. It should be understood that apparatus 800 represents one embodiment for implementing methodology 200 of FIG. 2 and/or methodology 300 of FIG. 3, both described above.

Apparatus 800 comprises a computer system 810 and removable media 850. Computer system 810 comprises a processor 820, a network interface 825, a memory 830, a media interface 835 and an optional display 840. Network interface 825 allows computer system 810 to connect to a network, while media interface 835 allows computer system 810 to interact with media, such as a hard drive or removable media 850.

As is known in the art, the methods and apparatus discussed herein may be distributed as an article of manufacture that itself comprises a machine-readable medium containing one or more programs which when executed implement embodiments of the present invention. For instance, the machine-readable medium may contain a program configured to obtain spatially dense three-dimensional thermal distribution and air flow measurements made in the data center using a mobile off-line surveying system; create a temperature and air flow model for the data center using the spatially dense three-dimensional thermal distribution and air flow measurements; use the temperature and air flow model to make thermal distribution and air flow predictions of the data center; and compare the thermal distribution and air flow predictions with the thermal distribution and air flow measurements made using the mobile off-line surveying system to produce a validated model for the data center. The program may, for example, also be configured to determine whether a margin of error between the thermal distribution and air flow predictions and the thermal distribution and air flow measurements is acceptable; make one or more changes to the temperature and air flow model if the margin of error between the thermal distribution and air flow predictions and the thermal distribution and air flow measurements is unacceptable; and repeat the use, compare and determine steps until the margin of error between the thermal distribution and air flow predictions and the thermal distribution and air flow measurements is acceptable.

The machine-readable medium may be a recordable medium (e.g., floppy disks, hard drive, optical disks such as removable media 850, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor 820 can be configured to implement the methods, steps, and functions disclosed herein. The memory 830 could be distributed or local and the processor 820 could be distributed or singular. The memory 830 could be implemented as an electrical, magnetic or optical memory, or any combination of these or other types of storage devices. Moreover, the term "memory" should be construed broadly enough to encompass any information able to be read from, or written to, an address in the addressable space accessed by processor 820. With this definition, information on a network, accessible through network interface 825, is still within memory 830 because the processor 820 can retrieve the information from the network. It should be noted that each distributed processor that makes up processor 820 generally contains its own addressable memory space. It should also be noted that some or all of computer system 810 can be incorporated into an application-specific or general-use integrated circuit.

Optional video display 840 is any type of video display suitable for interacting with a human user of apparatus 800. Generally, video display 840 is a computer monitor or other similar video display.

As highlighted above, the CFD methodology using the NS equations or potential flow techniques and equations can be used to generate a data center model. FIG. 9 is a diagram illustrating exemplary methodology 900 for creating a temperature flow model, such as a NS-CFD model or a potential flow model, using MMT V1.0 measurements. Data center modeling tools using CFD methods having a wide library of data center build components (such as perforated tiles, CRAC units and IT rack equipment) are commercially available and can be used in conjunction with methodology 900. As highlighted above, in the present data center models key inputs are perforated tile air flow rates and temperatures, rack heat loads and air flow rates, CRAC air flow rates, as well as several miscellaneous details, such as tile perimeter leakage flow rates, location of cable openings and direction of CRAC unit flow. Methodology 900 is directed to the rapid generation of the inputs required to construct the model.

In step 902, a variety of different data collection activities are conducted, including, but not limited to, a visual inspection of the racks, three-dimensional temperature mapping using MMT V1.0, perforated tile air flow measurements, perforated tile temperature measurements, layout definition (layout information of the facility (data center) is gathered), rack inlet and outlet temperature measurements, exit velocity to rack (i.e., velocity at rear (back) of the rack or at an exhaust region of a front-to-back server rack) measurements and total input power to the data center measurements. In step 904, the NS-CFD model inputs for the racks are defined, i.e., factors and calculations that will help estimate rack parameters, such as rack power levels and flow. According to an exemplary embodiment, weighting factors are assigned to rack power levels (using rack inlet and outlet temperatures and exit velocities), flow per sever node for the racks is estimated, rack powers are calculated using total power and weighting factors and rack flows are calculated using exit velocity and server information. While the total rack power is often known via measured data from the PDUs, the power of each individual rack needs to be determined via name plate information, individual rack configurations and an estimation of computational intensity of operation of the IT equipment.

In step 906, additional parameters are estimated, such as air flow parameters related to the CRACs, the perforated tiles and data center air leakage flow via miscellaneous openings. A mass average of tile temperatures and CRAC, lighting and IT equipment power estimates can also be made.

In step 908, all of the necessary input information is entered into the NS-CFD model (or potential flow or Laplacian model). According to an exemplary embodiment, a model shell is first built based on the data center layout information. Next, the tile air flow data and an average of the tile temperature data are entered into the model. The air leakage flow estimates for the perforated tiles and miscellaneous openings are used in the model. Lighting loads are added to the model as a power input.

In step 910, the NS-CFD model (or potential flow or Laplacian model) is solved and three-dimensional temperature data obtained from the model is organized in a manner that facilitates comparison to the corresponding data collected using MMT V1.0. This step also includes a calculation of error via simple subtraction, or by means of more sophisticated statistical metrics, to quantify the accuracy of the model. According to an exemplary embodiment, the temperature data from the model and the temperature data from MMT V1.0 are compared point by point in three-dimensional space, and global and local error metrics and statistics are generated.

In step 912, a decision is made regarding the accuracy of the model results. A negative answer results in changes to the rack model inputs from step 904, while a positive answer allows for use of the model, in step 914, for simulating "what if" scenarios and design optimizations. As highlighted above, an error range of from about 10% to about 30% is reasonable for data centers.

Figure 10A:
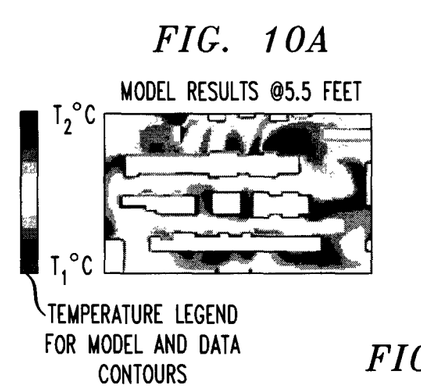
FIGS. 10A-C are plan view temperature contour plots illustrating a comparison of experimental and data center model data with an unacceptable amount of error present according to an embodiment of the present invention.
Figure 10B:
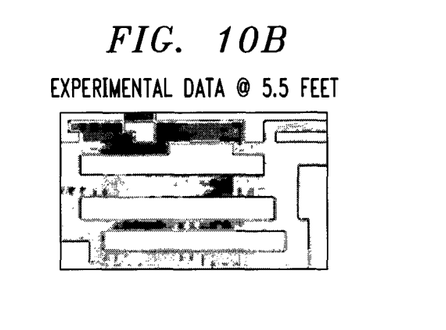
Figure 10C:
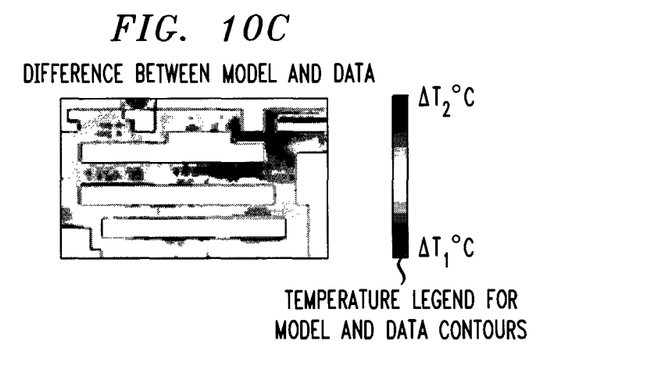

FIGS. 10A-C are plan view temperature contour plots for a single height of 5.5 feet illustrating a comparison of MMT V1.0 data and NS-CFD (or potential flow or Laplacian) model data with an unacceptable amount of error present. Namely, FIG. 10A is a plan view temperature contour plot of the NS-CFD (or potential flow or Laplacian) model results, FIG. 10B is a plan view temperature contour plot of the experimental (MMT V1.0) data and FIG. 10C is a plan view temperature error contour plot of the difference between the model and experimental data (model—experimental data). As seen in FIGS. 10A and 10B, both the model and experimental data show a hot spot region to exist in top-central and top-right regions of the plan view. While there appears to be much more pronounced hot and cold regions in the model data, the experimental data shows more "mixed" temperature values. These results can be interpreted as that the model inhibits the mixing between hot and cold air streams as compared to what is observed in reality. The data as illustrated in FIG. 10B also shows less pronounced hot and cold regions when looking at the plan view in horizontal section from the top to the bottom, i.e., by aisle. On examining FIG. 10A in the same manner, one observes a much more pronounced spatial non-uniformity in the temperature contours. FIG. 10C shows the temperature error contours yielding high values of model temperature compared to the data in the top right hand corner of the plan view. The difference in size of the white space between the model and experimental data contour plots is due to MMT V1.0 needing a bit of clearance between itself and the racks, and MMT V1.0 can also not reach every portion of the data center. The errors in this case are considered to be unacceptably high and the NS-CFD (or potential flow or Laplacian) model is "asked" to make changes to its inputs.

Figure 11A:
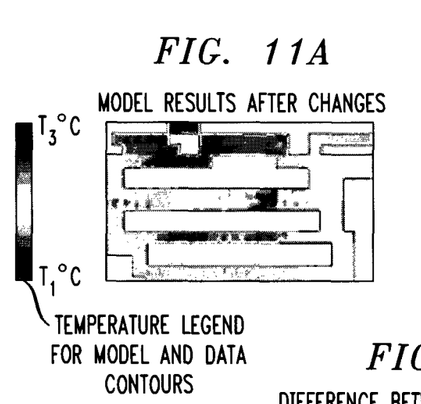
FIGS. 11A-C are plan view temperature contour plots illustrating a comparison of experimental and data center model data with an acceptable amount of error present according to an embodiment of the present invention.
Figure 11B:
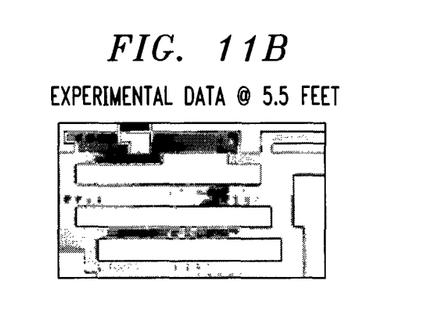
Figure 11C:
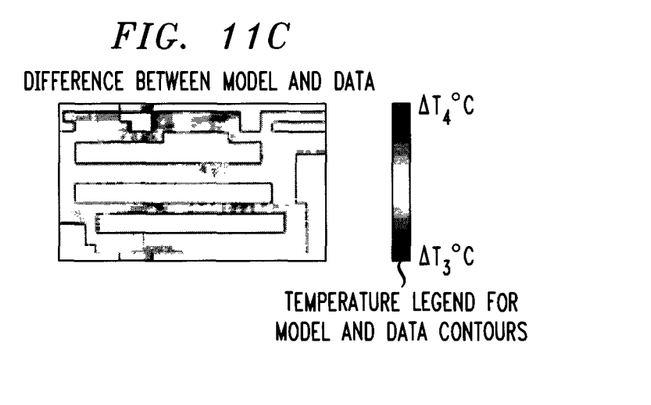

FIGS. 11A-C show the corresponding temperature plots and error plots after these changes have been made, the model has been run again and the results have been compared to the experimental (MMT V1.0) data. Namely, FIG. 11A is a plan view temperature contour plot of the updated NS-CFD (or potential flow or Laplacian) model results, FIG. 11B is a plan view temperature contour plot of the experimental (MMT V1.0) data and FIG. 10C is a plan view temperature error contour plot of the difference between the model and experimental data (model—experimental data). In this case, the errors are lower than an acceptable threshold (an acceptable amount of error is present) and the model can now be use for further analyses.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for modeling a data center, comprising the steps of:

obtaining three-dimensional thermal distribution and air flow measurements made in the data center using a mobile off-line surveying system;

creating a temperature and air flow model for the data center using the thermal distribution and air flow measurements, wherein the temperature and air flow model created is a Laplacian model having separate temperature and air flow fields with the air flow field being represented by $\nabla^2 \phi = 0$, wherein $\phi$ is flow potential;

setting an actual relative value for the flow potential somewhere in the data center;

using the temperature and air flow model to make thermal distribution and air flow predictions of the data center; and comparing the thermal distribution and air flow predictions with the thermal distribution and air flow measurements made using the mobile off-line surveying system to produce a validated model for the data center.

2. The method of claim 1, wherein the mobile off-line surveying system is mobile measurement technology V1.0.

3. The method of claim 1, wherein the temperature field is represented by $\rho c_p \text{vgrad}(T) + \text{div}(k\ \text{grad}(T)) + h = 0$, wherein $\rho$ is air density, $c_p$ is specific heat, v is velocity vector, T is absolute temperature, h is power dissipation/heat removal and k is thermal conductivity.

4. The method of claim 1, wherein the temperature field is represented by $$\frac{\partial}{\partial x}\left[\alpha \frac{\partial T}{\partial x} - v_x T\right] + \frac{\partial}{\partial y}\left[\alpha \frac{\partial T}{\partial y} - v_y T\right] + \frac{\partial}{\partial z}\left[\alpha \frac{\partial T}{\partial z} - v_z T\right] = 0,$$

wherein T is absolute temperature, $v_x$ is air flow velocity in x direction, $v_y$ is air flow velocity in y direction and $v_z$ is air flow velocity in z direction.

5. The method of claim 1, further comprising the steps of:
determining whether a margin of error between the thermal distribution and air flow predictions and the thermal distribution and air flow measurements is within an acceptable margin of error of from 10% to 30%;

making one or more changes to the temperature and air flow model if the margin of error between the thermal distribution and air flow predictions and the thermal distribution and air flow measurements is unacceptable; and repeating the using, comparing and determining steps until the margin of error between the thermal distribution and air flow predictions and the thermal distribution and air flow measurements is within the acceptable margin of error.

6. The method of claim 1, further comprising the step of: calculating an error correction array.

7. The method of claim 1, further comprising the step of: using the temperature and air flow model to optimize the data center.

8. An apparatus for modeling a data center, the apparatus comprising:
a memory; and
at least one processor, coupled to the memory, operative to:
obtain three-dimensional thermal distribution and air flow measurements made in the data center using a mobile off-line surveying system;
create a temperature and air flow model for the data center using the thermal distribution and air flow measurements, wherein the temperature and air flow model created is a Laplacian model having separate temperature and air flow fields with the air flow field being represented by $\nabla^2 \phi = 0$, wherein $\phi$ is flow potential;
set an actual relative value for the flow potential somewhere in the data center;
use the temperature and air flow model to make thermal distribution and air flow predictions of the data center; and
compare the thermal distribution and air flow predictions with the thermal distribution and air flow measurements made using the mobile off-line surveying system to produce a validated model for the data center.

9. The apparatus of claim 8, wherein the temperature field is represented by $\rho c_p \text{vgrad}(T) + \text{div}(k\ \text{grad}(T)) + h = 0$, wherein $\rho$ is air density, $c_p$ is specific heat, v is velocity vector, T is absolute temperature, h is power dissipation/heat removal and k is thermal conductivity.

10. The apparatus of claim 8, wherein the temperature field is represented by $$\frac{\partial}{\partial x}\left[\alpha \frac{\partial T}{\partial x} - v_x T\right] + \frac{\partial}{\partial y}\left[\alpha \frac{\partial T}{\partial y} - v_y T\right] + \frac{\partial}{\partial z}\left[\alpha \frac{\partial T}{\partial z} - v_z T\right] = 0,$$

wherein T is absolute temperature, $v_x$ is air flow velocity in x direction, $v_y$ is air flow velocity in y direction and $v_z$ is air flow velocity in z direction.

11. The apparatus of claim 8, wherein the at least one processor is further operative to:
determine whether a margin of error between the thermal distribution and air flow predictions and the thermal distribution and air flow measurements is within an acceptable margin of error of from 10% to 30%;

make one or more changes to the temperature and air flow model if the margin of error between the thermal distribution and air flow predictions and the thermal distribution and air flow measurements is unacceptable; and repeat the use, compare and determine steps until the margin of error between the thermal distribution and air flow predictions and the thermal distribution and air flow measurements is within the acceptable margin of error.

12. An article of manufacture for modeling a data center, comprising a machine-readable recordable medium containing one or more programs which when executed implement the steps of:
obtaining three-dimensional thermal distribution and air flow measurements made in the data center using a mobile off-line surveying system;
creating a temperature and air flow model for the data center using the thermal distribution and air flow measurements, wherein the temperature and air flow model created is a Laplacian model having separate temperature and air flow fields with the air flow field being represented by $\nabla^2 \phi = 0$, wherein $\phi$ is flow potential;
setting an actual relative value for the flow potential somewhere in the data center;
using the temperature and air flow model to make thermal distribution and air flow predictions of the data center; and
comparing the thermal distribution and air flow predictions with the thermal distribution and air flow measurements made using the mobile off-line surveying system to produce a validated model for the data center.

13. The article of manufacture of claim 12, wherein the temperature field is represented by $\rho c_p \text{vgrad}(T) + \text{div}(k\ \text{grad}(T)) + h = 0$, wherein $\rho$ is air density, $c_p$ is specific heat, v is velocity vector, T is absolute temperature, h is power dissipation/heat removal and k is thermal conductivity.

14. The article of manufacture of claim 12, wherein the temperature field is represented by $$\frac{\partial}{\partial x}\left[\alpha\frac{\partial T}{\partial x}-v_x T\right]+\frac{\partial}{\partial y}\left[\alpha\frac{\partial T}{\partial y}-v_y T\right]+\frac{\partial}{\partial z}\left[\alpha\frac{\partial T}{\partial z}-v_z T\right]=0,$$

wherein T is absolute temperature, $v_x$ is air flow velocity in x direction, $v_y$ is air flow velocity in y direction and $v_z$ is air flow velocity in z direction.

15. The article of manufacture of claim 12, wherein the one or more programs which when executed further implement the steps of:

- determining whether a margin of error between the thermal distribution and air flow predictions and the thermal distribution and air flow measurements is within an acceptable margin of error of from 10% to 30%;
- making one or more changes to the temperature and air flow model if the margin of error between the thermal distribution and air flow predictions and the thermal distribution and air flow measurements is unacceptable; and
- repeating the using, comparing and determining steps until the margin of error between the thermal distribution and air flow predictions and the thermal distribution and air flow measurements is within the acceptable margin of error.

\* \* \* \* \*